United States Patent [19]

Nikolaus

[11] Patent Number: 4,928,487
[45] Date of Patent: May 29, 1990

[54] CONTROL APPARATUS FOR DOUBLE ACTING HYDRAULIC CYLINDER UNITS

[75] Inventor: Heinrich Nikolaus, Hamburg, Fed. Rep. of Germany

[73] Assignee: Mannesmann Rexroth GmbH, Lohr/Main, Fed. Rep. of Germany

[21] Appl. No.: 741,216

[22] Filed: Jun. 5, 1985

Related U.S. Application Data

[63] Continuation of Ser. No. 487,615, Apr. 22, 1983, abandoned.

[30] Foreign Application Priority Data

May 10, 1982 [DE] Fed. Rep. of Germany ....... 3217527

[51] Int. Cl.$^5$ .............................................. F16D 31/02
[52] U.S. Cl. ........................................ 60/414; 60/459; 60/461; 60/486
[58] Field of Search .................... 91/420; 60/413, 414, 60/459, 461, 468, 486

[56] References Cited

U.S. PATENT DOCUMENTS

| 3,574,999 | 4/1971 | Nectoux | 60/461 |
| 3,824,896 | 11/1971 | Tull, III | 91/420 |
| 4,118,149 | 10/1978 | Hagberg | 60/468 |
| 4,240,255 | 12/1980 | Benilan | 60/468 |

FOREIGN PATENT DOCUMENTS 1948258 3/1970 Fed. Rep. of Germany .
2349351 11/1977 Fed. Rep. of Germany .

Primary Examiner—Charles T. Jordan
Assistant Examiner—Michael J. Carone
Attorney, Agent, or Firm—Harness, Dickey & Pierce

[57] ABSTRACT

A cylinder unit is supplied with pressurized fluid from a hydraulic machine which is variable in speed and/or displacement. The machine may be operated as a pump and as a motor to increase the pressure or, respectively, to decrease the pressure so that the piston of the cylinder unit may be actuated in both directions and, furthermore, the brake energy is recovered by the machine when the piston is driven through an external load. This results in an increased efficiency of the control apparatus for the cylinder unit avoiding any problems arising from heat.

12 Claims, 2 Drawing Sheets

CONTROL APPARATUS FOR DOUBLE ACTING HYDRAULIC CYLINDER UNITS

This application is a continuation of application Ser. No. 487,615, filed Apr. 22, 1983 now abandoned.

FIELD OF THE INVENTION

The present invention relates to a control apparatus for double acting hydraulic cylinder units which are connected to a line of impressed system pressure including means for recovering energy in both directions of piston movement.

PRIOR ART

According to the prior art cylinder units are connected to a central pressure source which usually consists of a pressure controlled or volume controlled pump. The working direction of the cylinder unit is determined by directional control valves and the speed of the movement is varied by volume control valves, proportional valves and so on. The proportion of the pump pressure which is not consumed by the cylinder unit is converted into heat by being throttled in a pressure valve upstream of the control valve. In braking or lowering a load, the energy coming free is converted into heat in a brake valve which heat has to be dissipated by additional cooling means. This results in substantial disadvantages.

SUMMARY OF THE INVENTION

Accordingly, it is an object of the present invention to improve the control apparatus for the cylinder unit to become capable of an increased efficiency and lower energy consumption.

It is a further object of the present invention to incorporate double acting cylinder units in a pressure system such that additionally to the desired pressurization of both cylinder spaces for actuation in both directions the brake energy which is generated by an outer load acting on the cylinder unit either in a direction of lowering or a direction of raising is recovered and may be fed back to the system.

According to the teaching of the present invention the pressure line above referred to is connected to one cylinder space of the cylinder unit directly and to the other cylinder space through a hydraulic machine which is coupled to a drive, wherein the displacement and/or the speed of the machine is variable to control the volume of pressurized medium to and from the cylinder space and wherein the operation of the machine may be changed from motor mode to pump mode to decrease or increase the pressure in said cylinder space to generate hydraulic and/or mechanical energy in the motor mode.

An impressed system pressure prevails in the pressure line to actuate one or a number of cylinder units. The fluid volume to be fed to a particular cylinder unit is taken from the pressure line having a predetermined impressed pressure and is adjusted by the hydraulic machine to the required power need of the cylinder unit. The machine can be either operated to increase the pressure by being driven from an external source to lift a load or, respectively, can be operated to decrease the pressure to lower a load so that the machine is driven and recovers energy as a motor.

Accordingly, the hydraulic machine acts either as a motor unit (a fluid volume of decreased pressure flows from or to the cylinder) or as a pump (the fluid volume of increased pressure flows from or to the cylinder).

Accordingly, the drive system of the present invention allows a four-quadrant-operation. For example, for pushing a load the pressure in the cylinder space being connected to the hydraulic machine must be higher than the system pressure in the pressure line, the hydraulic machine has to increase the pressure of the volume taken from the pressure line: thus the machine works in the pump mode and is mechanically driven. Vice versa, for drawing a load, the pressure in the pressure line is higher and the volume of fluid displaced by the piston must be pumped back into the pressure line, thus the machine operating in the pump mode being mechanically driven. However, when the piston of the cylinder is lowered by a load causing a pressure in the cylinder space to be connected to the machine higher than the system pressure, the displaced volume of fluid drives the machine which now operates in the motor mode and recovers energy. This is also true for the case that a load moves the piston of the cylinder in an opposite direction, wherein the pressure in the cylinder space being connected to the hydraulic machine is lower than in the pressure line, the volume of higher pressure being displaced from the piston into the pressure line driving the hydraulic machine which recovers energy.

The volume of fluid flowing through the hydraulic machine may be either adjusted by the speed and/or by a variable displacement of the machine to control the speed of movement of the piston in the cylinder.

According to a further embodiment of the invention the energy recovered by the hydraulic machine is either mechanically available at the drive shaft or hydraulically in the pressure line, the driving unit either operating as a generator or providing an accumulator in the pressure line being loaded. Preferably, both features may be combined, wherein a hydraulic and mechanical energy recovery may be selected depending on load requirements.

Furthermore, the hydraulic machine and the hydraulic pump to supply medium to the pressure lines are coupled to a common drive means, in particular an internal combustion engine. The hydraulic machine operating to recover mechanical energy thus relieves the combustion engine driving the pump to generate the system pressure.

According to the invention, the hydraulic machine is connected to the cylinder space of the larger piston area and the pressure line to the cylinder space with the smaller piston area when the double acting cylinder unit is a differential cylinder. Basically, the hydraulic connection of the differential cylinder may be made vice versa. In an embodiment, where the cylinder space being normally connected to the pressure line may be selectively connected to the reservoir to relieve the hydraulic machine, the connection of the differential cylinder referred to above has an advantage since the larger piston area is to be supplied with fluid to actuate the cylinder unit.

According to a further embodiment a switching valve is provided which is actuated depending on the pressure prevailing in the conduit leading from the hydraulic machine to the cylinder space. Accordingly, the pressure of the working fluid acting on the larger piston area is efficiently converted into power.

The switching valve has a pressure-responsive switching hysteresis which is relatively high. The valve is actuated to allow the fluid being displaced from the opposite cylinder space to flow to the reservoir when the pressure in the conduit connecting the hydraulic machine to the cylinder space with the larger piston area reaches a predetermined value. The pressure release in the cylinder space with the smaller piston area results in a corresponding pressure decrease in the opposite cylinder space which decrease depends on the ratio between both piston faces, wherein activating the pressure monitor and actuating the switching valve must be avoided. The pressure monitor may be only activated when the pressure in the line connecting the hydraulic machine to the cylinder space is substantially smaller. From this results that the switching valve should have relatively high switching hysteresis.

According to a further embodiment a plurality of parallel cylinder units is controlled by a single hydraulic machine in the manner described.

Furthermore, pressurized fluid may be taken through a pressure reducing valve from the line connecting the hydraulic machine to the cylinder unit, this fluid being supplied to the servo cylinder of the hydraulic machine which is provided to adjust the stroke of the machine. Accordingly, the hydraulic machine is automatically readjusted to zero stroke when the pressure in the line between the machine and the cylinder space collapses. This helps to avoid cavitation phenomina in the hydraulic machine.

According to a further embodiment the speed of the hydraulic machine is monitored by a speed sensor. Accordingly, the stroke of the hydraulic machine and thus the displacement may be decreased to lower its drive power when the speed of the driving machine is substantially decreased. Moreover, the speed sensor avoids an overspeed of the combustion engine when the hydraulic machine operates in the motor mode (decreasing the absorption capacity).

BRIEF DESCRIPTION OF THE DRAWINGS

Specific embodiments of the invention are described in detail below, are set forth by way of example only and should not be construed as to limit the scope of invention which is defined in the appended claims. In the attached drawings

DETAILED DESCRIPTION

Figure 1:
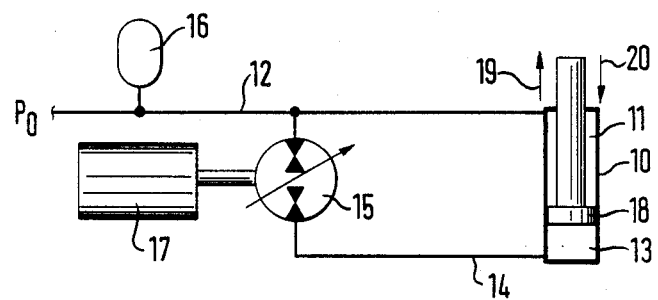
FIG. 1 shows a control system according to a first embodiment.

FIG. 1 shows a cylinder unit 10 which cylinder space associated with the smaller piston face is connected to a pressure line 12 and which cylinder space 13 associated with the larger piston face is connected via a line 14 and a hydraulic machine 15 to the pressure line 12 which is still connected to a hydraulic accumulator 16. The hydraulic machine 15 is coupled to a prime mover 17, for example an electrical machine which may operate in the motor and generator mode.

A predetermined system pressure P0 is maintained constant in the pressure line 12 by a pressure source which is not shown in FIG. 1.

The hydraulic machine 15 is an axial piston-type machine, for example, having a variable absorption or, respectively, displacement volume. The stroke of the machine may be adjusted either manually or by a servo motor not shown.

The machine 15 operates as a pump when driven by the machine 17. Assuming that the pressure in the line 14 is higher than in the pressure line 12, the piston 18 of the cylinder 10 will be moved in the direction of arrow 19. The fluid displaced from the cylinder space 11 flows into the pressure line 12. Contrarily, when the pressure in the cylinder space 11 shall move the piston 18 against an outer load in the direction of arrow 20, the machine 15 must be driven alike and pumps the fluid being displaced from the space 13 back into the pressure line 12 of higher pressure.

However, when the piston 18 is lowered by an outer load acting in the direction of arrow 20 and when the pressure prevailing in the cylinder space 13 thereby exceeds the pressure in the pressure line 12, the machine 15 is driven by the fluid volume being displaced through the line 14 thus operating as a motor which drives the machine 17. Vice versa, when a load pulls the piston 18 in the direction of arrow 19 to displace fluid from the cylinder space 11, the pressure in cylinder space 13 is decreased and the hydraulic machine 15 is driven by the fluid which flows via line 14 into the cylinder space 13. Thus, the machine 15 delivers drive energy to the machine 17.

Accordingly, the piston 18 may be moved in both directions 19 and 20 by means of the stroke adjustment of the machine 15 which either works as a pump or, respectively, as a motor recovering energy when the piston 18 is moved into direction 19 or into direction 20 under the action of a load.

The absorption or displacement volume of the axial piston machine not only depends on the stroke adjustment but also on the speed. Thus, the piston speed may additionally be adjusted by selecting the speed.

It should be understood that the cylinder space may be connected to a reservoir instead of being connected to the pressure line 12. This is thought for the case when the cylinder unit is single acting to lift the piston into the direction of arrow 19. A hydraulic and mechanical energy recovery is possible alike eliminating any heat problems. However, this statement is only true for a motion in the direction of arrow 20.

The embodiment of FIG. 1 has a disadvantage insofar as moving the piston 18 in the direction of arrow 19 takes place against the pressure in the pressure line 12 so that the power action in the direction 19 is substantially limited. Assuming, for example, that the relation between the areas of the piston 18 is 1:2, the power exercised in the direction of arrow 19 decreases about 50%. This drawback may be avoided by the control system shown in FIG. 2 in which identical components carry the same reference numerals. However, according to FIG. 2 the cylinder space is connected through a switching valve 21 to the pressure line 12 or to reservoir T. Actuation of the valve 21 is initiated by a pressure monitor 22 which is connected to line 14.

When the pressure in line 14 is increased by operation of the machine 15 to move the piston 18 in the direction of arrow 19, the pressure monitor 22 actuates the valve 21 when a predetermined pressure valve is reached to connect the cylinder space to the reservoir; accordingly the fluid displaced from the cylinder space 11 flows to the reservoir.

On the other side when the pressure in line 14 decreases by virtue of the machine 15 to move the piston 18 in the direction of arrow 20, the pressure monitor 22 is activated when a predetermined lower pressure level is reached to connect the cylinder space 11 to the pressure line 12.

Both pressure values to which the pressure sensor 22 responds to switch the valve 21 should provide a relatively high difference to avoid the danger to switch the valve 21 when it is not desired. Assuming that the cylinder space 11 is vented to the reservoir in moving the piston 18 in the direction of arrow 19, the pressure in cylinder space 13 and thus in line 14 is lowered according to the ratio of the different piston areas, but the valve may not be switched through the pressure sensor 22 to connect the cylinder space 11 to the pressure line 12. Accordingly, the pressure sensor 22 should incorporate relatively high switching hysteresis. For example, the valve 21 should switch to connect the cylinder space 11 to reservoir when the pressure P0 in the pressure line is 200 bar and when the pressure P1 in the line 14 is 300 bar. Provided the ratio of the piston areas is 1:2, the pressure in line 14 is decreased to P1=100 bar, but the valve 21 may not be actuated. Therefore, the actuation of valve 21 must take place at a pressure value being lower.

Figure 2:
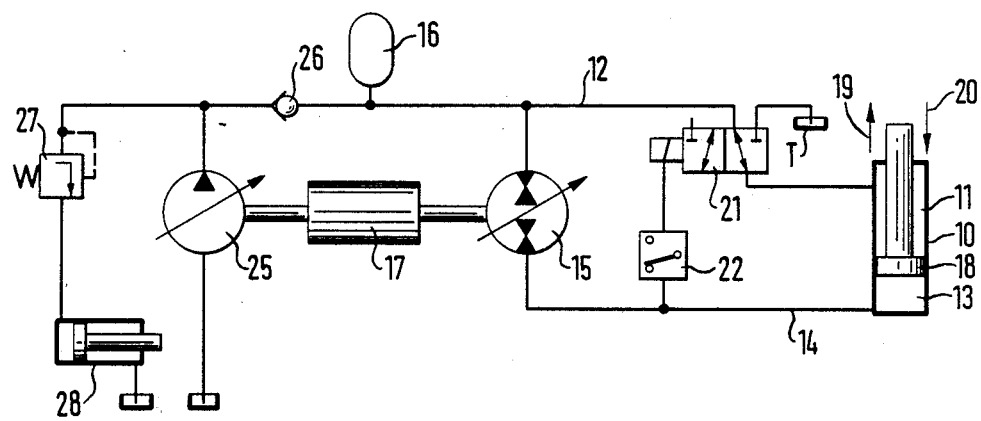
FIG. 2 shows a control system in a further enlarged embodiment.

The valve 21 in FIG. 2 generally represents the switching element of a two-step automatic gear for a differential cylinder unit.

According to FIG. 2 a variable displacement pump 25 is driven by the combustion engine 17 supplying pressurized fluid into the pressure line 12 via a check valve 26. The pressure delivered by the variable displacement pump 25 is maintained constant independent of the displacement volume by a stroke adjustment means 28 which is connected to the pressure line via a pressure reducing valve 27. The engine 17 is relieved by the hydraulic machine 15 operating in the motor mode for energy recovery.

Figure 3:
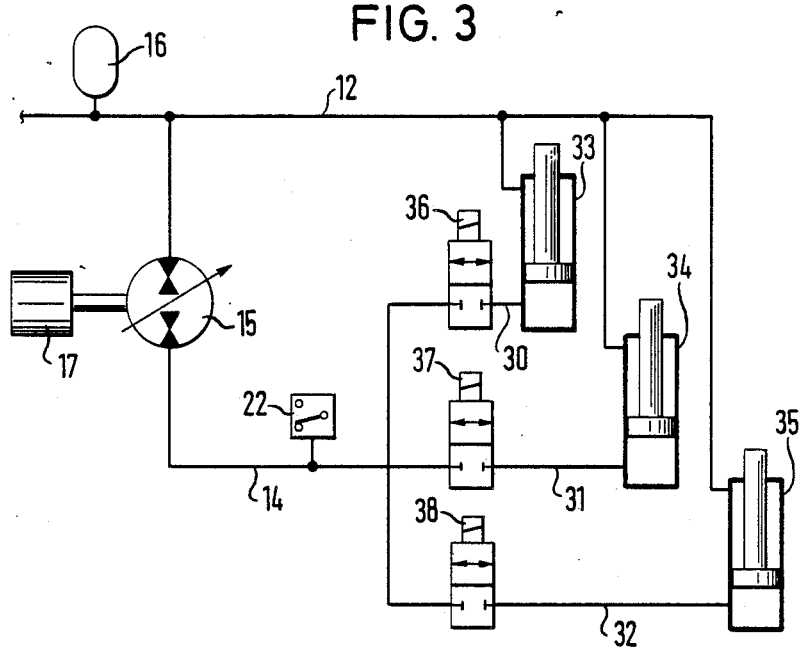
FIG. 3 shows a control system for a plurality of cylinder units.

FIG. 3 shows a plurality of cylinder units 33, 34, 35 which are connected in parallel to the line 14 via corresponding branches 30, 31, 32. The cylinder spaces which are located opposite the cylinder spaces being connected to branches 30 to 32 are directly connected to the pressure line 12. Directional control valves 36, 37, and 38 are provided to selectively actuate the cylinders. Still other installations may be supplied with fluid from pressure line 12.

In the embodiment of FIG. 3 each branch 30, 31, 32 may be provided with pressure responsive means comprising a pressure sensor being responsive to the pressure in the particular cylinder and a switching valve so that individual pressure difference values may be selected for each cylinder to switch the valve. However, it is further possible to provide the pressure sensor in the line 14 in common for all cylinders.

Figure 4:
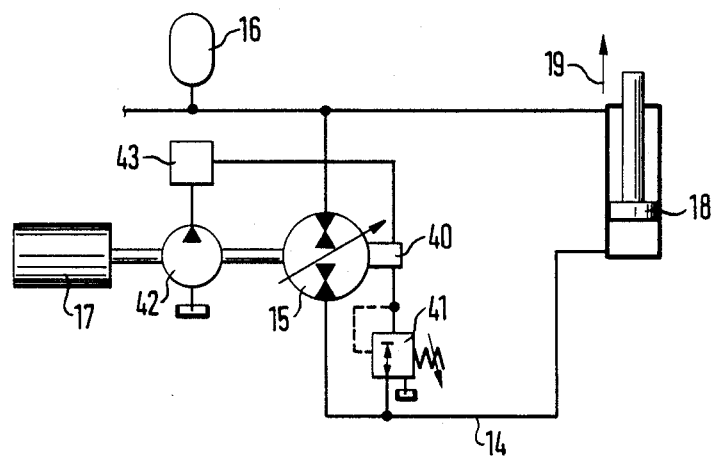
FIG. 4 shows a control system in a still further embodiment.

A further embodiment is shown in FIG. 4 in which the hydraulic machine 15 is provided with a servo motor 40 to adjust the stroke. The control fluid supply for the servo motor 40 is taken from line 14 including a pressure reducing valve 41 if required. Assuming that the piston 18 is moved in the direction of arrow 19 by the action of an outer load the pressure in line 14 may be highly decreased. When the pressure in line 14 falls below a predetermined value, the servo motor 40 adjusts the machine 15 to zero stroke to lock the machine 15 resulting in continuous deceleration of piston 18 until a standstill. This avoids evacuating of the line 14 thus preventing damage caused by cavitation in the machine 15. Furthermore, the danger is avoided that the engine 17 operates with a speed too high in view of an extremely high energy recovery of the machine 15, since an exceedingly high power consumption of the machine 15 is avoided through an adjustment of its displacement volume by means of a hydraulic or a electrical speed sensor.

According to FIG. 4 the hydraulic machine 15 is connected to a variable displacement pump 41 which delivers pressurized fluid via a pressure balance valve 43 to the servo motor 40 of the machine 15. When the speed of the engine 17 is highly decreased due to the power consumption of the machine 15, the stroke of the hydraulic machine is adjusted towards a smaller displacement volume via the speed sensor to lower the power consumption of the machine 15.

What is claimed is:

1. A hydraulic system for operating a load comprising a double acting hydraulic cylinder unit supplied with fluid from a pressure line, a constant pressure source continuously supplying fluid under a constant pressure to said pressure line including means for recovering energy in both directions of piston movement, said pressure line being connected to one cylinder space of said cylinder unit directly for actuating the piston thereof in a first direction and a conduit means connecting said pressure line to the other cylinder space, a hydraulic machine interposed in said conduit means and having a variable flow for controlling the volume of pressurized medium flowing between said other cylinder space and said pressure line, said machine being operable in either a pump mode to increase the pressure in said other cylinder space to move said piston in a direction opposite to said first direction or operable as motor when said piston moves in said first direction to generate energy when functioning in the motor mode.

2. The hydraulic system of claim 1, further including drive means coupled to the hydraulic machine for driving said hydraulic machine in the pump mode or being driven by said hydraulic machine when in the motor mode.

3. The hydraulic system of claim 1, wherein the means for recovering energy comprises means for storing hydraulic energy produced in the motor mode comprising a hydraulic accumulator connected to the pressure line.

4. The hydraulic system of claim 1, wherein the constant pressure source comprises a hydraulic pump and the hydraulic machine and said hydraulic pump are connected to a common drive means.

5. The hydraulic system of claim 4, wherein the drive means is an internal combustion engine.

6. The hydraulic system of claim 1 wherein the hydraulic cylinder unit comprises a hydraulic machine connected to the cylinder space including the larger piston area and the pressure line is connected to the cylinder space including the smaller piston area.

7. The hydraulic system of claim 6, wherein the cylinder space including the smaller piston area is selectively connected to the pressure line or to a reservoir via a valve.

8. The hydraulic system of claim 7, wherein the valve is a switching valve operable in response to the pressure in the line connecting the hydraulic machine to the cylinder space having the larger piston area.

9. The hydraulic system of claim 8, wherein a pressure sensor is provided in the line connecting the hydraulic machine to the cylinder space having the larger piston area, said pressure sensor being operatively connected to said switching valve for operating said switching valve, said pressure sensor having a predetermined relatively high pressure responsive switching hysteresis.

10. The hydraulic system of claim 1, wherein a plurality of cylinder units are connected to a common hydraulic machine via control valves.

11. The hydraulic system of claim 1, wherein the hydraulic machine comprises a servo motor-actuated hydraulic machine for stroke adjustment, wherein the servo motor being connected via a pressure reducing valve to the line connecting the hydraulic machine to the cylinder unit.

12. The hydraulic system of claim 11, wherein the hydraulic machine incorporates a speed sensor generating a speed responsive signal for controlling the servo motor of the hydraulic machine.

* * * * *